United States Patent [19]  
Olsen

[11] 4,324,805  
[45] Apr. 13, 1982

[54] METHOD OF PRODUCING SOY PROTEIN HYDROLYSATE FROM FAT-CONTAINING SOY MATERIAL, AND SOY PROTEIN HYDROLYSATE

[75] Inventor: Hans A. S. Olsen, Vanløse, Denmark

[73] Assignee: Novo Industri A/S, Denmark

[21] Appl. No.: 166,405

[22] Filed: Jul. 7, 1980

[30] Foreign Application Priority Data

Jul. 11, 1979 [GB] United Kingdom ............... 24177/79

[51] Int. Cl.³ .............. A23J 3/00; A23L 1/20
[52] U.S. Cl. ........................ 426/46; 426/52; 435/69; 435/836
[58] Field of Search .............. 426/44, 46, 52, 53; 435/69, 836

[56] References Cited

U.S. PATENT DOCUMENTS

| | | | |
|---|---|---|---|
| 2,802,738 | 8/1957 | Anson et al. | 426/46 |
| 3,950,544 | 4/1976 | Fridman | 426/46 |
| 3,966,971 | 6/1976 | Morehouse et al. | 426/44 X |
| 4,100,024 | 7/1978 | Adler-Nissen | 435/69 |
| 4,179,333 | 12/1979 | Braeumer et al. | 435/69 |
| 4,232,123 | 11/1980 | Braeumer et al. | 435/69 |

*Primary Examiner*—Robert A. Yoncoskie  
*Attorney, Agent, or Firm*—Fidelman, Wolffe & Waldron

[57] ABSTRACT

A method for producing soy protein hydrolysate involving water washing fat-containing soy material at a pH of 3.5–5.5 thereby partially defatting the soy material; then hydrolyzing the partially defatted soy material with a proteolytic enzyme in the presence of water and a base to a DH in the range of 1–20; and recovering the aqueous soy protein hydrolysate from soy derived oil and solids in the hydrolysis mixture. The oil is recovered from the wash water and from the hydrolysate mixture.

13 Claims, 2 Drawing Figures

METHOD OF PRODUCING SOY PROTEIN HYDROLYSATE FROM FAT-CONTAINING SOY MATERIAL, AND SOY PROTEIN HYDROLYSATE

The Invention relates to a method for producing soy protein hydrolysate from fat-containing soy material, and to the soy protein hydrolysate.

INTRODUCTION

Soy protein hydrolysate is a material of growing importance, for example, in the food industry. Thus, it can be used as one of the main constituents in brines for meat pumping in order to enrich the protein content thereof, as a constituent in soy milk in order to enrich the soy milk with protein, and as a protein enriching agent used as an additive for both acid and neutral soft drinks.

A method for production of soy protein hydrolysate from soy beans that had been defatted by extraction with organic solvents is known, being described, for example, in Fifth International Congress of Food Science & Technology, Abstract of paper 3B-14, "Enzymatic hydrolysis of soy protein. Processing developments and applications in low pH foods." However, the above referenced process for production of soy protein hydrolysate from defatted soy beans is not believed to be suited to fat-containing soy materials.

Herein and in the accompanying claims as well, the term "fat-containing soy material" is used generically to include full-fat and partially defatted soy flour, ground whole soy beans, crushed soy beans and similar soy materials.

Fat-containing soy material, especially full-fat soy flour, is available in huge amounts in industrially unsophisticated areas of the world.

For commercially feasible production of a refined soy protein hydrolysate product from fat-containing soy materials as a starting material, a concomitant recovery of the fat content is important. Usually the recovery of soy oil from soy beans is carried out by extraction with organic solvents, generally a hexane extraction. However, the solvent extraction process involves recovery of solvent by fractional distillation and distillation equipment requires a relatively high level of capital investment. Furthermore, the solvent process is not ideal from an environmental point of view, especially since solvents used for the extraction ordinarily are highly flammable. Moreover, the solvent extraction process is so elaborate as to be poorly suited to use at production sites in developing countries.

Thus, a need exists for a method for treatment of a fat-containing soy material well suited for production sites of a primitive nature, a method which results in an organoleptically acceptable soy protein hydrolysate and considerable recovery of the soy oil and other valuable materials present in the full fat-soy flour.

BRIEF STATEMENT OF THE INVENTION

The method for production of soy protein hydrolysate from fat-containing soy material according to the invention comprises hydrolyzing a partially defatted solid soy material, obtained by washing fat-containing soy material such as soy flour with an aqueous medium at an acid pH, the partially defatted soy material being treated with a proteolytic enzyme in the presence of water and a base to hydrolyze same to a DH in the range of from 1 to 20 and thereafter deactivating the enzyme, whereafter the aqueous hydrolysate is separated from the oil and solids.

A preferred embodiment of the method according to the invention includes the step of washing fat-containing soy material, in an aqueous medium having a pH in the range of from 3.5 to 5.5, preferably 4.2 to 4.5, at a relatively constant pH.

DISCUSSION OF THE INVENTION

Advantageously, the method of producing soy protein hydrolysate from fat-containing soy material according to the invention comprises washing the fat-containing soy material in an aqueous medium at a pH, preferably in the range of from 4.2 to 4.5 (Operation I). The wash water from Operation I is separated into an oil phase and a waste water phase (Operation II), the washed, partially defatted solid soy material from Operation I being then introduced into a hydrolysis reaction vessel, to which water, a proteolytic enzyme, and base are added. In the hydrolysis reactor, the partially defatted soy material from Operation I is hydrolyzed at a relatively constant pH to a degree of hydrolysis (DH) in the range of from 1 to 20 (Operation III), whereafter the proteolytic activity is inactivated by acid addition to a pH of 4.0 or less. The slurry from the hydrolysis of Operation III is separated into an oil phase, an aqueous hydrolysate phase and a sludge phase (Operation IV). The sludge phase from Operation IV is collected as Product A, the oil phases from Operations II and IV are combined as Product B and the aqueous soy protein hydrolysate phase from Operation IV is collected as Product C.

The invention also relates to the soy protein hydrolysates produced by the method of the invention.

The present invention provides a method well suited for production sites of a primitive nature capable of recovering a good yield of valuable soy protein hydrolysate without bitterness, without soy flavor and without any disadvantageous properties originating from the soy fat, the Product C, around 60% of the oil content in the initial fat-containing soy material as a separate oil phase, Product B, and a precipitate or sludge from the hydrolysis, which can be used either as a high grade fodder or for the starting material in a renewed hydrolysis step, Product A.

Surprisingly, it has been found that the soy protein hydrolysate of the invention can be fully acceptable from an organoleptic point of view and also that the oil phase does not turn rancid during the recovery thereof.

A preferred embodiment of the method according to practice of this invention comprises washing the sludge phase recovered from Operation IV (Operation V), whereafter the washed sludge or precipitate from Operation V is the material collected as Product A. The wash water from Operation V is separated into an oil phase and an aqueous hydrolysate phase (Operation VI), the oil phases from Operations II, IV and VI are combined into Product B and the aqueous hydrolysate phases from Operations IV and VI are combined into Product C. In this way, the low molecular compounds, for example, low molecular peptides, are washed out from the solid phase from Operation IV, which makes the sludge Product A well suited for repeated hydrolysis. If too many low molecular peptides are present in the material subjected to hydrolysis, the low molecular weight peptides will be decomposed enzymatically to materials that yield a bitter tasting product, and, in addition, the proteolytic enzymes will not primarily, as intended, decompose the high molecular soy protein, but rather primarily will decompose the low molecular peptides.

In a preferred embodiment of the method according to the invention, the separations in one or more, even all of Operations II, IV and VI are performed by means of centrifuges. In this way, fast and efficient separation may be obtained.

In a preferred embodiment of the method according to the invention, the proteolytic enzyme used for the hydrolysis is the alkaline proteinase produced by *Bacillus licheniformis,* and the hydrolysis is performed around the pH optimum of this enzyme. A preferred example of such proteolytic enzyme is the commercial product sold under the Trade Mark "ALCALASE" (subtilisin Carlsberg) by NOVO INDUSTRI A/S. This enzyme is able to split protein along the protein chain with such high hydrolysis rate that the minimal value DH is quickly reached.

The hydrolysis is performed at a pH in the range of 6–12 and desirably at a pH which does not differ more than 2.5 pH units from the optimum pH of the proteolytic enzyme, more preferably at about the optimum pH. The optimum pH of the proteolytic enzyme should be determined by means of a substrate related to the hydrolysis mixture. If, for example, "ALCALASE" is used as the proteolytic enzyme, the enzyme activity curve and thus the optimal pH activity can be determined by means of the modified Anson method described in NOVO Enzyme Information IB No. 058 e-GB [the original Anson method is described in J. Gen. Physiol., 22, 79–89 (1939)]. According to this method, the pH optimum for "ALCALASE" in the hydrolysis mixture is around 9.0 and the pH during hydrolysis should accordingly in this preferred embodiment of the invention have a value in the range of from 6.5 to 11.5.

In a preferred embodiment of the method according to the invention, the hydrolysis is carried out to a DH in the range of from 8 to 12.

The proteolytic activity is preferably inactivated by means of malic or citric acid.

The hydrolysis may be performed in any desired manner, such as that known per se, from the disclosure of U.S. Pat. No. 4,100,024.

Also, the soy oil phase can be purified in any desired manner, for instance, by the known per se method of removing residual amounts of protein and water.

The degree of hydrolysis (DH) is defined by the equation:

$$DH = \frac{\text{Number of peptide bonds cleaved}}{\text{Total number of peptide bonds}} \times 100\%$$

Reference is made to J. Adler-Nissen, J. Agric. Food Chem., Vol. 24, No. 6, (1976) page 1090–1093 where a more detailed discussion of the definition of DH appears.

The number of the peptide bonds cleaved can be measured by means of the ninhydrin method. The ninhydrin method is described in Moore, S., Stein, W. H., "Photometric Ninhydrin Method for use in the Chromatography of Amino Acids", J. Biol. Chem., 176, 367–388 (1948).

The DH can also be determined if the course of hydrolysis is followed by means of the pH-STAT method, as described in Jacobsen, S. F., Leonis, J. Linderstrøm-Lang, K., Ottesen, M., "the pH-STAT and its use in Biochemistry", in Glick, D., (edit.), "Methods of Bio-chemical Analysis", Vol. IV, pp. 171–210, Interscience, Publishers Inc., New York (1957).

As is apparent from the above the DH plays an important role in the invention, inasmuch as the hydrolysis is controlled by means of the DH; only when DH has reached a critical value, the hydrolysis may be terminated. The DH is, so to speak, the main parameter of the hydrolysis.

PREFERRED EMBODIMENTS OF THE INVENTION

For better understanding of the present invention and to show how the same may be put into effect, reference will now be made, by way of example, to the accompanying drawings that illustrate a preferred mode for practice of the invention.

Figure 1:
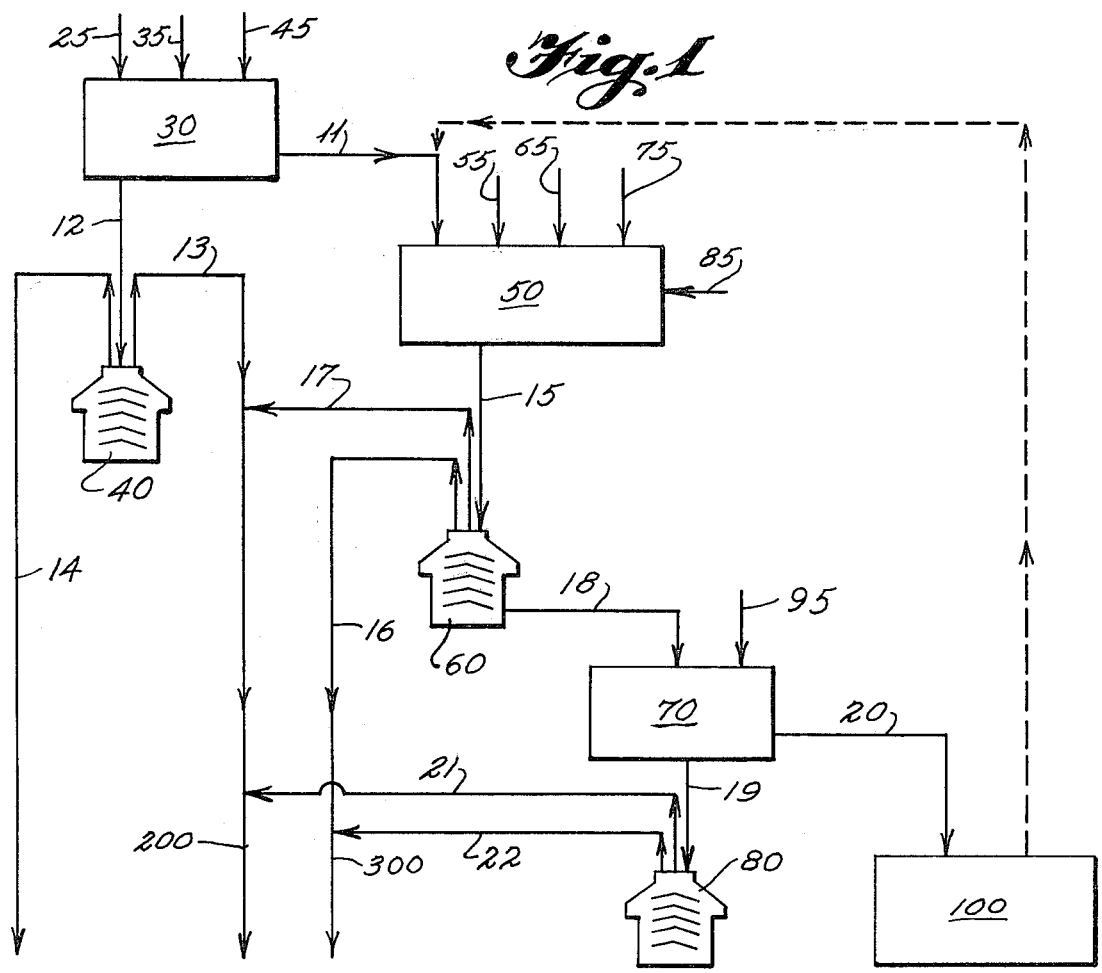
FIG. 1 shows a flow sheet of a preferred embodiment of the method.

Referring now to FIG. 1, a fat-containing soy material 25, which should of course be obtained from the soy plant without formation of off-flavors e.g., soy flour by crushing soy beans, is washed (extracted) with water 35 in washer 30 (Operation I). Sufficient acid 45 is introduced initially into washer 30 until the pH in the wet soy material is in the range of from 4 to 4.5. By pH turns out to be essentially constant, even if large amounts of water are later added. The soy material is washed until it has a bland taste, and until all soluble materials (at pH 4 to 4.5) are removed. A stepwise washing operation in which each wash step includes separation of the liquid and the solid phases may be used. The washing operation may be countercurrent, or with fresh or recycled wash water in each wash step. At least four wash steps are preferred.

If a liquid/solid ratio of 10:1 is used in each wash step, the separation from Operation I can be carried out by means of decanter centrifuges or other types of separators. Suitable types of equipment that may be used are, for example, basket centrifuges, continuous or batch-operating countercurrent extractors or press-equipment. From the washing step of Operation I, a partially defatted and washed soy material 11 is removed. Furthermore, the total amount of wash liquid 12 is recovered and in separator 40 (Operation II), this liquid is separated into an oil phase 13 and an oil free wash water phase 14, which may be regarded as waste water.

The partially defatted and washed soy material 11 is transferred to a hydrolysis reaction tank 50 equipped with a stirrer, thermometer and pH-electrodes connected to a titrator, wherein hydrolysis (Operation III) takes place. Water 55 is added to the soy material 11 until the protein concentration in the reaction mixture is in the range of from 6 to 10% (N×6.25). Base 75, e.g., NaOH is added. The temperature of the reaction mixture is adjusted to 50°–55° C. and the proteinase 65, preferably "ALCALASE" is added. If the hydrolysate is intended for nutritional purposes, a food grade preparation of the proteolytic enzyme is used in amounts sufficient to carry out hydrolysis in around two hours.

The enzymatic hydrolysis (Operation III) is carried out at constant pH within a preferred range of 7.5–8.5, more preferably at around pH 8.0. In order to maintain the chosen pH for the reaction, continuous addition of base 75 e.g., NaOH, is necessary during the hydrolysis reaction. As described in Adler-Nissen Process Bio-chem. 12(6)18, (1977), the DH can be calculated from the consumption of base 65.

When DH reaches the predetermined value, a preferred value being 10%, the hydrolysis is terminated by addition of acid 85 to a pH of 4.0. The proteolytic enzyme is inactivated after 30 minutes at pH 4.0 and 50° C. When malic or citric acids are used for the inactivation, the product hydrolysate is non-bitter. Other acids may be used for inactivation provided they do not interfere disadvantageously with the ultimate product, e.g., a food product for which the hydrolysate is intended.

The finished hydrolysate 15 is then passed to separator 60 wherein it is separated (Operation IV) into an oil phase 17, a soy protein hydrolysate 16 and a sludge phase 18, the last containing insoluble protein, polysaccharides and residual amounts of oil. Preferably, a three-phase-centrifuge is used for separator 60, but the combination of a solids ejecting centrifuge followed by a liquid separator is also usable.

The sludge phase 18 is washed (Operation V) with water 95 in washer 70 in order to increase the yield of hydrolysate. This washing process may be carried out just as has already been described for Operation I. The washed sludge or precipitate phase 20, leaving washer 70 to become product 100 may be repeat enzyme treated in the same manner as phase 11. The washed sludge may be a product of the process, i.e., product 100, to be used as animal feed or as raw material for soy sauce or other fermented products.

The wash liquid phase 19 is passed to separator 80 wherein it is separated (Operation VI) into an oil phase 21 and an oil-free aqueous hydrolysate phase 22.

The oil phases 13, 17 and 21 from separators 40, 60 and 80 of Operations II, IV and VI are combined into oil product 200 from which pure soy bean oil may be isolated.

The oil-free aqueous phases 16 and 22 from separators 60, 80 of Operations IV and VI are combined to become the raw soy protein hydrolysate of product 300. Product 300 then may be carbon treated, concentrated and dried, as described in, for example, U.S. Pat. No. 4,100,024.

The invention is further illustrated by the following examples.

EXAMPLE 1

600 g of full-fat soy flour 25 (Nutridan TF-100-L from Dansk Soyakagefabrik A/S) having the following composition:
Protein (N×6.25): 43.2%
Fat: 20.5%
Dry matter: 95.0%
was stepwise washed at pH 4.2. Each step includes a stirring of the solid phase and water for 30 minutes followed by a centrifugation at 3000×g for 20 minutes in a laboratory centrifuge (Beckmann model J-6B). Results obtained from this multi-step washing procedure (Operation I) are shown in Table 1, together with the composition of protein (N×6.25), fat and total dry matter of the partially defatted soy flour and the combined centrifugates from the four steps. Based on these results the mass balance and yields are shown in Table 2. (The word "Nutridan" is a Trade Mark, as is the word "Beckmann").

To 666.5 g of the partially defatted soy flour solids taken off the centrifuge the pH value of which was 4.35, was added 39.6 ml of 4 N NaOH to reach pH 8.0, and 1282 g of water 55 to dilute the suspension to approximately 8% protein (N×6.25). The mixture was heated to 50° C. in a water bath. Then 3.20 g of "ALCALASE" 0.6 (0.65 Anson units per gram) was diluted to 50 ml with water and added to the suspension containing the partially defatted soy flour. Thereby an enzyme activity of 13.1 Anson units per kg protein was obtained.

Figure 2:
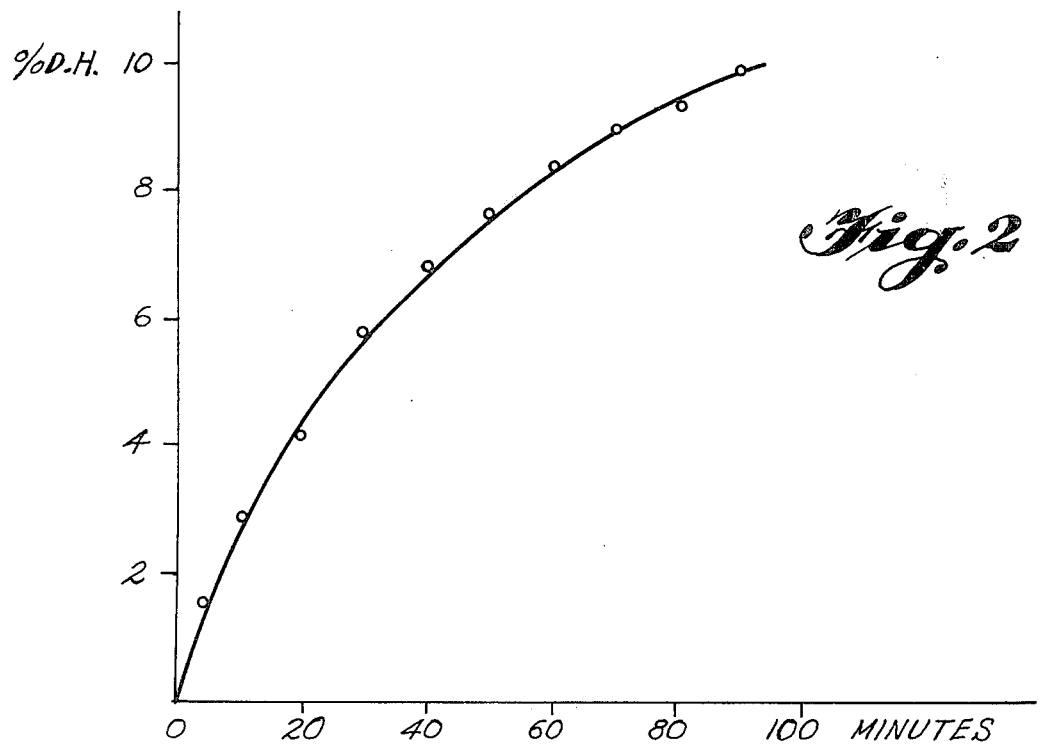
FIG. 2 shows the time—DH relationship pertaining to Example 1.

During the hydrolysis pH was kept constant at pH 8.0 by further addition of 4 N NaOH, using the pH-stat-method. The degree of hydrolysis was calculated on the basis of the consumption of base by means of the relationship referred to in the above reference article of J. Adler-Nissen. The DH-time relationship obtained is shown graphically in FIG. 2. At DH=10% 27.2 ml of 4.0 N NaOH had been consumed, at which point the hydrolysis was terminated by addition of DL-malic acid 85 until pH=4.0, requiring 44 g of DL-malic acid. The hydrolysis mixture was thereafter maintained at 50° C. for 30 minutes in order to inactivate the enzyme.

The hydrolysis mixture was then centrifuged (Operation IV) in a laboratory centrifuge (Beckmann model J-6B) at 3000 x g for 15 minutes, and 1500 g of a centrifugate containing both oil and protein hydrolysate, and 554 g of sludge was collected. The sludge phase 18 was washed with 1500 g of water and centrifuged as above to yield 1500 g of centrifugates and 500 g of sludge being Product A. The results obtained after performance of the above described Operations III, IV and V are shown in Table 3.

After skimming the oil phases therefrom, the two centrifugates from Operations IV and VI were combined and adjusted to pH=5 by 4 N NaOH (amount not determined), then activated carbon (BGN from Lurgi Apparate-Technik) was added in an amount of 0.2% of the total volume of hydrolysate. After stirring for 30 minutes at 50° C. the activated carbon was removed by filtration through a glass fibre filter (Watman glass fibre GF/F) which had previously been washed with 5 liters of deionized water, in order to remove off-flavors from the filter. The filtrate was adjusted to pH=6.5 and diluted to 4% protein (N×6.25) before evaluation by means of a trained taste panel consisting of 14 persons. This product hydrolysate was compared with a sample produced from defatted flakes, as described in e.g., Fifth International Congress of Food Science & Technology, Abstracts of paper, 3B-14, "Enzymatic hydrolysis of soy protein. Processing development and applications low pH foods". A triangle-taste-evaluation resulted in seven right answers and seven wrong answers, indicating that a taste difference could not be demonstrated. (The word "Watman" is a Trade Mark.)

TABLE 1

| CENTRIFUGATE AND SOLID PHASE RELATED TO OPERATION I | | | | | |
|---|---|---|---|---|---|
| | 1. step | 2. step | 3. step | 4. step | Combined or final |
| Full-fat soy flour (g) | 600 | — | — | — | — |
| 6 N HCl (ml) | 34.5 | 0 | 0 | 0 | — |
| Water (g) | 6000 | 6000 | 5000 | 5000 | — |
| Centrifugate: | | | | | |

TABLE 1-continued
CENTRIFUGATE AND SOLID PHASE RELATED TO OPERATION I

|  | 1. step | 2. step | 3. step | 4. step | Combined or final |
|---|---|---|---|---|---|
| Mass (g) | 5160 | 5300 | 5000 | 5000 | 20460 |
| Protein conc., N × 6.25 (%) | 0.25 | 0.07 | 0.07 | 0.04 | 0.10 |
| Dry matter (%) | 2.22 | 0.49 | 0.23 | 0.15 | 0.78 |
| Fat (%) | not determ. | not determ. | not determ. | not determ. | 0.20 |
| Solid phase: |  |  |  |  |  |
| Mass (g) | 1050.6 | 991.4 | 1032.0 | 1009.7 | 1009.7 |
| Protein conc. N × 6.25 (%) | not determ. | not determ. | not determ. | 23.9 | 23.9 |
| Dry matter (%) | " | " | " | 40.7 | 40.7 |
| Fat (%) | " | " | " | 8.2 | 8.2 |

TABLE 2
MASS BALANCE AND YIELDS RELATED TO OPERATION I

|  | Full-fat soy flour | Combined centrifugate | Partially defatted soy flour |
|---|---|---|---|
| Total mass (g) | 600 | 20460 | 1009.7 |
| Mass of dry matter (g) | 570.1 | 159.6 | 410.9 |
| Yield (%) | 100 | 28.0 | 72.1 |
| Mass of protein (g) | 259.1 | 20.5 | 241.3 |
| Yield (%) | 100 | 7.9 | 93.1 |
| Mass of fat (g) | 123 | 40.9 | 82.8 |
| Yield (%) | 100 | 33.3 | 67.3 |

TABLE 3
RESULTS OBTAINED AFTER PERFORMANCE OF OPERATIONS III AND IV

| Process step and fraction | Mass of fraction, g | % Protein | Yield of protein % Based on partially defatted flour/ based on full-fat flour | % Fat | Yield of fat % Based on partially defatted flour/ based on full-fat flour |
|---|---|---|---|---|---|
| Operation III. |  |  |  |  |  |
| Partially defatted soy flour | 666.5 | 23.9 | 100/93.1 | 8.2 | 100/67.3 |
| After hydrolysis | 2117.8 | 7.5 | 100/93.1 | 2.6 | 100/67.3 |
| Operation IV. |  |  |  |  |  |
| Centrifugate 17 + 16 | 1500 | 4.3 | 40.6/37.8 | 1.2 | 32.7/22.2 |
| Sludge 18 | 554 | not analysed |  | not analysed |  |
| Operation V |  |  |  |  |  |
| Centrifugate 21 + 22 | 1500 | not Analyzed |  | Not Analyzed |  |
| Product A | 500 | 14.3 | 44.9/41.8 | 7.3 | 66.8/45.0 |

EXAMPLE 2

20 kg of full-fat soy flour (Nutridan TF-100 L from Dansk Soyakagefabrik A/S) having the composition indicated in Example 1 was stepwise washed at pH=4.2 using 4×180 liters of water of 15–20° C. (Operation I), acid being introduced into the first wash step only. Each wash step includes stirring of the solid phase and water followed by centrifugation in a decanter centrifuge (Alfa-Laval NX 310-B). The sludge content in the centrifugate (determined after centrifugation of 10 ml in a graduated tube) was 2–4%. Therefore, the centrifugate was re-centrifuged in a solids ejecting centrifuge Westfalia (SB 7-35-076). The results are shown in Table 4. The centrifuge indicated in Table 4 was the centrifugate from the Westfalia centrifuge and the sludge was the combined (total) sludge from the decanter and the solids ejecting centrifuge (Operation I). The total combined 630 liters of centrifugate were separated into 2.8 kg of oil phase and 627 kg of an oil-free aqueous phase using a Westfalia centrifuge of type LG 205-2. The results obtained are shown in Table 5. (The word "Westfalia" is a Trade Mark.)

Based on these results the mass balance and yield related to operations I and II are shown in Table 6.

To 41 kg of the partially defatted soy flour was added 46 kg of water to dilute the sludge to about 6.75% protein. 685 ml of 4.8 N NaOH was added to adjust the pH to 8.0. The mixture was stirred and heated to 55° C. in a tank with a heating mantle. 118 g of "ALCALASE 0.6 L (0.65 Anson units/g) was diluted to 5 liters with cold water and added to the suspension. During the hydrolysis, pH was kept constant at 8.0 by addition of 4.8 N NaOH using the pH-STAT-technique. A DH of 10% was reached after 133 minutes when 843 ml of 4.8 N NaOH had been consumed. Immediately thereafter, 1887 g DL-malic acid was added to give a pH of 4.0. The suspension was stirred for 30 minutes in the heated tank to inactivate the enzyme (Operation III).

The hydrolysis mixture was then centrifuged in the solids-ejecting centrifuge (Westfalia SB 7-35-076) and 37 liters of centrifugate was recovered together with 50 liters of diluted sludge. The centrifugate was then separated into 84 g of oil and 34 liters of oil-free aqueous phase (Operation IV).

The sludge was washed with 70 liters of water (Operation V) and separated into 73 liters of sludge Product A and 45 liters of wash liquid which in turn was separated into 43 liters of oil-free aqueous phase and 66 g of oil (Operation VI). Results obtained during the recovery of soy protein hydrolysate are shown in Table 7.

The oil-free hydrolysates from Operations IV and VI were combined (Product C), filtered, carbon treated, concentrated by reverse osmosis and freeze dried.

The oil-phases from Operation IV and VI were combined with the oil phase from Operation II, giving rise to oil Product B.

The composition and yields of the combined Products A, B and C, i.e., Products 100, 200, 300, are shown in Table 8.

It appears from the following Tables that the accuracy of the mass balances is not complete. This is due to the inaccuracy which accompanies weighing and measuring of small amounts in relatively large equipment.

TABLE 4

CENTRIFUGATE AND SOLID PHASE RELATED TO OPERATION I

|  | 1. step | 2. step | 3. step | 4. step | Combined or final |
|---|---|---|---|---|---|
| Full-fat soy flour (kg) | 20.0 | — | — | — | — |
| 6N HCl (kg) | 1.3 | — | — | — | — |
| Water (kg) | 180.0 | 180 | 180 | 180 | 720 |
| Centrifugate: | | | | | |
| Mass (kg) | 155 | 160 | 160 | 155 | 630 |
| Protein (% N × 6.25) | 0.38 | 0.13 | 0.13 | 0.13 | 0.25 |
| Dry matter (%) | 3.30 | 0.43 | 0.50 | 0.21 | 0.96 |
| Fat (%) | 1.23 | 0.16 | not determ. | 0.20 | 0.50 |
| Solid phase: | | | | | |
| Mass (kg) | 59.3 | 57.4 | 51.8 | 51.5 | 51.5 |
| Protein (% N × 6.25) | 16.44 | 16.0 | 15.06 | 14.19 | 14.19 |
| Dry matter (%) | 27.51 | 27.7 | 22.95 | 21.77 | 21.77 |
| Fat (%) | 4.12 | not determ. | not determ. | 1.80 | 1.80 |

TABLE 5

RESULTS OBTAINED AFTER PERFORMANCE OF OPERATION II

|  | Combined centrifugate | Oil phase | Oil-free phase |
|---|---|---|---|
| Mass (kg) | 630 | 2.8 | 627 |
| Protein (% N × 6.25) | 0.25 | 1.44 | 0.19 |
| Dry matter (%) | 0.96 | 62.4 | 0.77 |
| Fat (%) | 0.50 | 59.6 | not determ. |

TABLE 6

MASS BALANCE AND YIELDS RELATED TO OPERATIONS I AND II

|  | Operation I | | | Operation II | |
|---|---|---|---|---|---|
|  | Full-fat soy flour | wash liquid | Partially defatted soy flour | Oil-phase | Oil free phase |
| Total mass (kg) | 20.0 | 630 | 51.5 | 2.8 | 627 |
| Mass of DM (kg) | 19.0 | 6.05 | 11.2 | 1.75 | 4.83 |
| Yield (%) | 100 | 31.8 | 59.0 | 9.2 | 25.4 |
| Mass of protein (kg) | 8.64 | 1.58 | 7.31 | 0.04 | 1.19 |
| Yield (%) | 100 | 18.5 | 84.6 | 0.5 | 13.9 |
| Mass of fat (kg) | 4.10 | 3.15 | 0.92 | 1.67 | not determ. |
| Yield (%) | 100 | 76.8 | 22.4 | 40.7 | |

TABLE 7

RESULTS OBTAINED AFTER PERFORMANCE OF OPERATIONS III, IV, V, AND VI

| Operation and fraction | Mass of fraction kg | % protein | Yield of protein % based on partially defatted flour | Yield of protein % based on full-fat flour | % fat | Yield of fat Based on partially defatted flour | Yield of fat Based on full-fat flour |
|---|---|---|---|---|---|---|---|
| Operation III | | | | | | | |
| 11 | 41 | 14.19 | 100 | 84.6 | 1.80 | 100 | 22.4 |
| 15 | 95.5 | 6.56 | — | — | (1.67) | — | — |
| Operation IV | | | | | | | |
| 17 | 0.084 | 2.63 | 0.04 | 0.03 | 60.4 | 6.9 | 1.5 |
| 16 | 34 | 4.38 | 25.6 | 21.7 | — | — | — |
| 18 | 50 | 7.63 | 65.6 | 55.5 | not analyzed | — | — |
| Operation V | | | | | | | |
| 10 A | 73 | 2.75 | 34.5 | 29.2 | not analyzed | — | — |
| 11 | 45 | 1.88 | 14.5 | 12.3 | not analyzed | — | — |
| Operation VI | | | | | | | |
| 21 | 0.066 | 2.53 | 0.03 | 0.02 | 61.5 | 5.5 | 1.2 |
| 22 | 43 | 1.81 | 13.4 | 11.3 | — | — | — |

( ) means that the figure is unrealistic.

TABLE 8

COMPOSITION AND YIELDS OF PRODUCT A, B AND C BASED ON FULL-FAT SOY FLOUR

| Component | A | B | C |
|---|---|---|---|
| Protein % | 2.75 | 1.5 | 2.99 |
| Yield % | 29.2 | 0.5 | 33.0 |
| Dry matter % | 10.3 | 65 | 4.5 |
| Yield % | (84.2) | 10 | 22.9 |
| Oil % | not determ. | 60 | — |
| Yield % | not determ. | 43.4 | — |

( ) means that the figure is unrealistic.

I claim:

1. An organic solvent free method for producing soy protein hydrolysate from soy material containing recoverable amounts of oil which comprises:
   water washing such a soy material at a pH of 3.5–5.5 thereby partially defatting the soy material and extracting water soluble substances therefrom; then
   hydrolyzing the partially defatted soy material at pH 6–12 with effective amounts of a proteolytic enzyme in water to a DH in the range of 1–20; and, thereafter,
   separating the aqueous soy protein hydrolysate from soy derived oil and solids in the hydrolysis mixture.

2. The method of claim 1, wherein the fat-containing soy material is washed in an aqueous medium having a pH in the range of from 4.2 to 4.5.

3. The process of claim 2 wherein hydrolysis is carried out at about the optimum pH for the proteolytic enzyme.

4. The method of claim 1 wherein oil released from the soy material into the wash water is separated out therefrom, and oil released from the partially defatted soy material into the hydrolysate mixture is separated out therefrom, the wash water oil and the hydrolysate oil both being recovered.

5. A method according to claim 1 wherein the proteolytic enzyme used for the hydrolysis is the proteinase of *B. licheniformis* and the hydrolysis is performed at a pH in the range of 6.5–11.5.

6. A method according to claim 1 wherein the hydrolysis is performed at a pH which does not differ more than 2.5 pH units from the optimum pH of the proteolytic enzymes.

7. A method according to claim 1 wherein the hydrolysis is carried out to a DH in the range of from 8 to 12.

8. A method according to claim 1 wherein the proteolytic enzyme is inactivated by reducing the pH of the hydrolysis mixture to about pH 4.0 by addition of malic or citric acid to the hydrolysis mixture.

9. A method for production of soy protein hydrolysate and oil from soya material containing recoverable amounts of oil which comprises:
   water washing such a soy material at pH 3.5–5.5, thereby partially defatting the soy material; and extracting water soluble substances therefrom; then
   separating the wash water into an oil phase and an aqueous phase;
   hydrolyzing the partially defatted soy material at pH 6–12 with effective amounts of a proteolytic enzyme in water to a DH of 1–20; thereafter deactivating the proteolytic enzyme; and then
   separating the hydrolysis mixture into a sludge phase, an aqueous phase and an oil phase,
   the oil phases from the hydrolysis mixture and from the wash water being the oil product, and the aqueous phase from the hydrolysis mixture being the soy protein hydrolysate product.

10. The method of claim 9 wherein the sludge phase is water washed and wherein the washings therefrom are separated into oil phase and aqueous phase for recovery of additional oil and protein hydrolysate product therefrom.

11. The method of claim 9 wherein said aforementioned separations are carried out by centrifugation.

12. The process of claim 9 wherein the fat-containing soy material is water washed at a pH of 4.2–4.5.

13. The process of claim 9 wherein hydrolysis is conducted to a DH of around 10.

* * * * *